J. E. BOYLE.
Assignor, by mesne assignments, to H. W. COLLENDER.
Billiard-Table-Cushion.
No. 8,172. Reissued April 16, 1878.
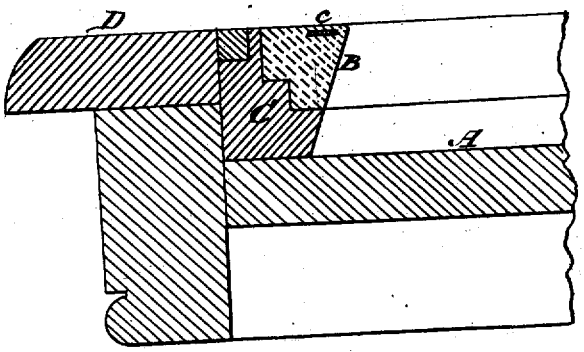
Witnesses:
E. Wolff.
Jacob Felbel
Inventor:
James E. Boyle
By atty
J. N. McCulloch
N. PETERS, PHOTO-LITHOGRAPHER, WASHINGTON, D. C.

UNITED STATES PATENT OFFICE.

JAMES E. BOYLE, OF BROOKLYN, NEW YORK, ASSIGNOR, BY MESNE ASSIGNMENTS, TO H. W. COLLENDER, OF NEW YORK CITY.

IMPROVEMENT IN BILLIARD-TABLE CUSHIONS.

Specification forming part of Letters Patent No. 154,743, dated September 8, 1874; Reissue No. 8,172, dated April 16, 1878; application filed March 23, 1878.

*To all whom it may concern:*

Be it known that I, JAMES E. BOYLE, of Brooklyn, in the county of Kings and State of New York, have invented a new and useful Improvement in Billiard-Table Cushions; and I do hereby declare the following to be a full, clear, and exact description of the same, reference being had to the accompanying drawing, forming part of this specification.

Previous to my invention, cushions or cushion-strips for billiard-tables have been made, in which were combined in various ways, with the rubber body, a strip of steel or other suitable face-hardening device, the function and effect of all such face-hardening devices in the rubber-cushion body being to prevent too great embedment of the ball into the face of the cushion, while, at the same time, the cushion should be lively enough to throw the ball off with sufficient elastic force. But in all cushions with which I am familiar in which any sort of face-hardening strip has been employed, it has been arranged with its surfaces nearly or quite parallel with the face of the cushion—that is to say, the ribbon-like strip of steel or other material employed to directly or indirectly receive the impact of the ball and dissipate the force of the blow given at a point over a considerable portion of the rubber body in rear of the face-hardening strip has been placed with its face about parallel with the face of the cushion, and so as to receive the blow of the ball upon its face.

In all such cushions the result is that, by continued use, the strip of steel or other material inserted within or applied to the face of the rubber body becomes crinkled, bent, or buckled up by the sharp blows to which it is subjected, and the rubber body in rear of said strip has its elasticity more or less destroyed by the sudden concussion of the broad surface against it in a direction in which the rubber body presents such an abundance of stock, and is so re-enforced by the wooden rail that said concussive action tends to disintegrate the particles of the vulcanized mass composing the body of the cushion.

My invention has for its object to provide a cushion for billiard-tables in which these objections will be wholly or partially overcome, while, at the same time, the cushion shall possess to the same extent, or in a greater degree, all the advantages as to the prevention of too great embedment of the ball, and the capacity to throw the ball off with the proper force possessed by the best cushions now in use; and to this end and object my invention consists in a billiard-cushion or cushion-strip, composed of a rubber body, such as usually employed, and a face-hardening strip of steel or other material, such as ordinarily used, but having the face-hardening strip of steel or other suitable material, which is combined with the rubber body, arranged nearly or quite parallel with the top surface of the cushion-strip in contradistinction to such an arrangement or placement of the face-hardening strip as permits the blow of the ball striking the face of the cushion to come substantially against the face of the metal or other strip.

To enable those skilled in the art to make and use my invention, I will proceed to more fully describe the construction and operation of a cushion embracing it, referring by letters to the accompanying drawing, making part of this specification, and in which is shown, in vertical section, a cushion made according to my invention.

A represents the part of the bed of a billiard-table, and B the cushion, secured, as usual, to the wooden holder-strip C, that is made fast to and forms part of what is termed the cushion-rail D of a table.

The cushion-strip B is made of vulcanized rubber, about of the form shown, and has combined with it a strip or thin piece of steel, *c*, which is made as nearly as possible of uniform width, thickness, and resiliency throughout its length, and which is arranged, as shown, nearly or quite parallel with the top surface of the cushion, (which, by preference, is slightly inclined downward from its rear upper corner, as usual,) and with its uppermost surface and front edge each about one-eighth of an inch from the upper and front surfaces of the rubber strip B.

By preference, I mold in the steel strip *c* in the same manner that face-hardening strips, differently placed, are now molded in other billiard-cushions prior to the process of vulcanization.

It will be understood that in the use of a cushion such as shown and described the force of impact of the ball, played against the face of the cushion, will be received by the spring *c* nearly edgewise of the latter, and so that the tendency will be to move the strip, when struck, backward and upward, and that thus a steel strip of the same size and quality will be rendered capable of sustaining a greater blow, and enduring more concussion at any point, when arranged as shown, than when so placed as to receive the force of a blow against its broad side or surface.

It will also be understood that in a cushion such as shown the steel strip, having its upper surface re-enforced by a thin layer only of rubber, and its rear edge forced toward the bulk of the rubber body, the rubber is afforded more opportunity for a ready movement of its particles, when the ball suddenly strikes the face of the cushion, and is not subject to that severe concussion in rear of the metal strip which, in cushions as usually made, tends to destroy the elasticity of the rubber body and disunite the parts of the cushion.

When the ball strikes the face of a cushion made as shown and described, it will be thrown off with the proper reactive force and at the proper angle, just as in other cushions of the best construction, because, though a less quantity of the rubber body is subjected to pressure, by the flat surface of the steel strip, the latter is, by its different arrangement, made capable of acting with greater force in the repellance of the ball.

At the same time, the upper part of the cushion-face is rendered capable of so hugging downward on to the ball forced in contact with it that there is less liability of the ball jumping off the table, even though the cushion be a little lower than one having the steel strip placed in the usual position relatively to the rubber body; and, as it is always desirable to have the cushion as low as possible, this is rather an advantage of my cushion over those previously known and used.

Of course the sizes, forms, and proportions of the body B and strip *c* may be varied some without damaging either the principle of construction or mode of operation of the cushion shown and described; and, in carrying out my invention, the steel or other strip *c* may have either its front edge, or top surface, or both, located farther from or nearer to the front and top surfaces of the rubber body B, as experience in the operation and wear of such cushions may demonstrate to be expedient.

What I claim as new, and desire to secure by Letters Patent, is—

A billiard-table cushion composed of a rubber body, and a steel or other suitable face-hardening strip, and having the face-hardening strip arranged about parallel with the upper surface of the rubber body, substantially as and for the purposes set forth.

In witness whereof I have hereunto set my hand this 18th day of March, 1878.

J. E. BOYLE.

In presence of—
WM. M. FOWLER,
JACOB FELBEL.